Figure 1:
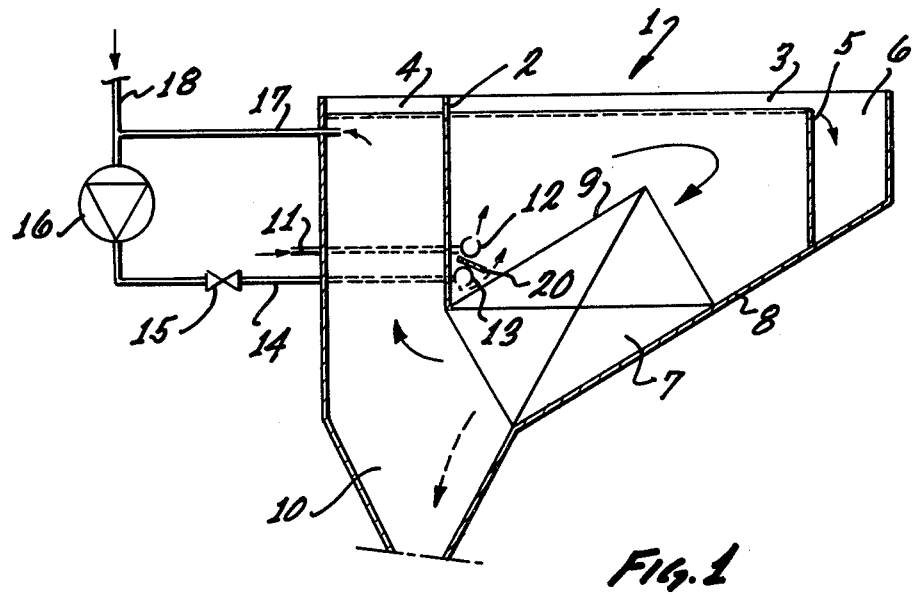

United States Patent [19]
Pielkenrood

[11] 4,160,737
[45] Jul. 10, 1979

[54] FLOTATION AND PLATE SEPARATION DEVICE

[75] Inventor: Jacob Pielkenrood, Krommenie, Netherlands

[73] Assignee: Pielkenrood-Vinitex B.V., Assendelft, Netherlands

[21] Appl. No.: 835,336

[22] Filed: Sep. 21, 1977

Related U.S. Application Data

[63] Continuation of Ser. No. 665,930, Mar. 11, 1976, abandoned, which is a continuation of Ser. No. 532,329, Dec. 13, 1974, abandoned.

[30] Foreign Application Priority Data

Dec. 22, 1973 [NL] Netherlands ............... 7317649

[51] Int. Cl.² ................................................ B01D 21/10
[52] U.S. Cl. ................................ 210/202; 210/195.1; 210/221 P; 210/259; 210/522; 210/535; 210/540; 261/36 R
[58] Field of Search ................. 210/44, 73 R, 730 W, 210/73 SG, 83, 84, 195 R, 221 P, 519, 521, 522, 534, 535, 536, 540, 202, 259, 294; 261/29, 123, 36 R; 209/168–170

[56] References Cited

U.S. PATENT DOCUMENTS

| | | | |
|---|---|---|---|
| 2,874,842 | 2/1959 | Kroft | 210/221 P |
| 3,250,394 | 5/1966 | Clark | 210/522 |
| 3,314,880 | 4/1967 | Rubin | 210/44 |
| 3,433,359 | 3/1969 | Lundin | 210/221 P |
| 3,479,281 | 11/1969 | Kikindai | 210/44 |
| 3,482,694 | 12/1969 | Rice | 210/73 SG |
| 3,754,656 | 8/1973 | Horiguchi | 210/221 P |
| 3,788,981 | 1/1974 | Richard | 210/519 |
| 3,799,511 | 3/1974 | Svantessin | 261/123 |
| 3,809,240 | 5/1974 | Savall | 210/44 |
| 3,836,460 | 9/1974 | Willis | 210/73 R |
| 3,837,501 | 9/1974 | Pielkenrood | 210/522 |
| 3,953,332 | 4/1976 | Speth | 210/521 |

FOREIGN PATENT DOCUMENTS

| | | | |
|---|---|---|---|
| 1213223 | 3/1966 | Fed. Rep. of Germany | 210/540 |
| 7001713 | 8/1971 | Netherlands | 210/521 |
| 7004494 | 9/1971 | Netherlands | 210/521 |
| 896997 | 5/1962 | United Kingdom | 210/521 |
| 1010874 | 11/1965 | United Kingdom | 210/540 |

Primary Examiner—Charles N. Hart
Assistant Examiner—Ernest G. Therkorn
Attorney, Agent, or Firm—Smyth, Pavitt, Siegemund, Jones & Martella

[57] ABSTRACT

A method for separating components suspended in a liquid, in which a gas-liquid mixture is pressurised, and then is depressurised just before being introduced in a separation device so as to obtain a substantially colloidal gas bubble mixture, the gas bubbles adhering to particles of the suspended components which are made flotating thereby, the device for executing this method comprising a liquid compression pump, a relief valve, and a nozzle opening into the separation device just behind this nozzle.

14 Claims, 3 Drawing Figures

FLOTATION AND PLATE SEPARATION DEVICE

This is a continuation of application Ser. No. 665,930 filed Mar. 11, 1976, now abandoned. Application Ser. No. 665,930 was, in turn, a continuation of application Ser. No. 532,329, filed Dec. 13, 1974, now abandoned.

For separating components suspended in a liquid, which components may be heavier or lighter than this liquid, various kinds of separation devices are known, in particular so-called plate separators in which the liquid is led through passages defined between superposed parallel and in particular corrugated plates. The separation effect depends, inter alia, on the size of the suspended particles and on the difference in specific weight between these particles and the carrier liquid. In order to promote the separation it can be favourable to bring about particle growth beforehand.

Apart from or instead of by means of preceding particle growth, the separation can also be enhanced by introducing air or another gas into the liquid so as to obtain a flotation effect by adhesion of gas to the particles to be separated. The invention provides a method and a device by means of which this can be effectively realised.

To that end, according to the invention, a liquid mixed with a gas or a substance vaporising at the prevailing temperature is pressurised and introduced into the supply chamber of the separation device, which gas-liquid mixture is depressurised just before introduction into the separation device so that a more or less colloidal gas bubble mixture is obtained in which components present in the liquid in this supply chamber are made floating by adhering gas bubbles.

Depending on the circumstances the said liquid is the liquid to be treated itself or a liquid mixed with gas which is supplied to the supply chamber separately from the liquid to be treated, in particular the carrier liquid stripped of suspended components obtained at the outlet of the separation device.

As a rule air is used as the gas, but in some cases use can be made of a gas already present in the liquid or of an evaporating substance.

Figure 2:
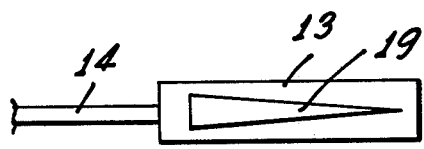

The invention will be elucidated below by reference to a drawing showing in:

FIG. 1 a schematic representation of a separation device according to the invention;

FIG. 2 a simplified view of an injection nozzle for this device; and

Figure 3:
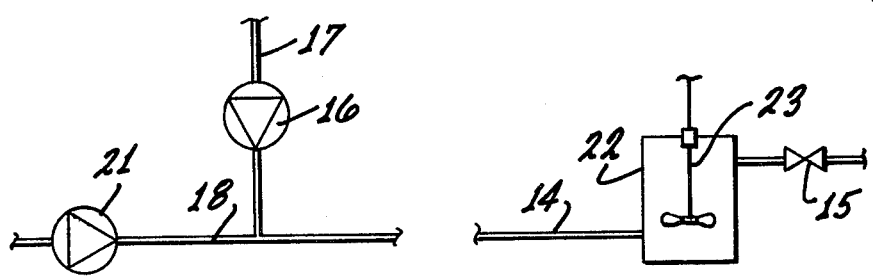

FIG. 3 another embodiment of a part of this device.

The device shown in FIG. 1, comprises a tank 1 from which is separated, by means of a partition 2, a supply chamber 3 and a discharge chamber 4. A second partition 5 constructed as an overflow weir separates from the tank 1 a discharge chamber 6 for the separated components which can flow off over the weir 5. In the chamber 3 a plate assembly 7 is provided which bears on a sloping wall 8 of the tank 1, the lower end of the upper wall 9 of this assembly joining the partition 2. The lower side of the discharge chamber 4 merges with a sediment discharge 10, and means not shown for discharging the cleaned liquid connect with the upper side of the chamber 4.

The liquid to be treated is supplied by means of a duct 11 which terminates in a nozzle 12 situated in the triangular space between the partition 2 and the upper wall 9 of the assembly 7. This nozzle is, in particular, formed by a tube extending across the full width of this space and provided with a longitudinal slot which is, in particular, shaped so as to ensure that the liquid will uniformly emerge. Possibly already separated floating components will immediately rise towards the surface of the liquid in the chamber 3, which liquid will then flow on through the plate assembly 7, in which remaining floating and possibly also sedimentating components are separated. The liquid stripped of these components then flows upwards into the chamber 4 and is discharged, and sediment slides downwards from the plates of the assembly 7 and arrives in the collecting funnel 10. The floating components slide upwards along the plates and will float on the liquid in the chamber 3.

Below the supply nozzle 12 a second nozzle 13 is located communicating with a duct 14. This duct comprises a throttle or relief valve 15 and leads to the pressure side of a compression pump 16. At the suction side of this pump a duct 17 is connected by means of which liquid can be sucked in from the discharge chamber 4. Moreover an air duct 18 opens in the duct 17 so that air is sucked in from the surroundings and is mixed with the liquid. This air is thoroughly mixed with the liquid in the pump 16 which is generally a centrifugal pump, and possibly occurring air bubbles are disrupted by the pump vanes. The pump 16 is adapted to produce in the duct 14 before the throttle valve 15 a considerable pressure, e.g. of $0.5 \ldots 1$ N/mm$^2$.

In view of static pressure differences it can sometimes be advisable to include in the air duct 18 an auxiliary pump for introducing the air at a certain pressure into the liquid.

The pressurized liquid which contains a considerable amount of air, and is, in particular, saturated therewith, is suddenly relieved behind the valve 15, so that, then, a supersaturated condition is obtained manifesting itself in a more or less colloidal distribution of small air bubbles injected by the nozzle 13 into the space above the plate assembly 7. These bubbles rise and mix with liquid introduced by the nozzle 12 into this space, and the air bubbles will adhere on particles suspended therein, which thus become lighter and are entrained towards the liquid surface.

FIG. 2 shows an embodiment of this nozzle 13 which extends across substantially the whole width of the chamber 3, and is provided with a longitudinal slot 19 through which the supplied liquid can emerge. In order to obtain a uniform distribution of the emerging liquid, this slot is made convergent in the flow sense. Also the supply nozzle 12 can be constructed in the same manner. In particular the slot 19 is directed downwards in order to obtain a better distribution of the appearing air bubbles which, moreover, can be promoted by arranging a guiding baffle 20 above the tube 13. It is also possible to make the tube 13 rotatable on its own axis in order to allow the outflow direction to be adjusted at will. Also the auxiliary baffle 20 can be made adjustable, and it is also possible to arrange this baffle in another place, for instance above the nozzle 12.

FIG. 3 shows another embodiment in which air is supplied at the pressure side of the pump 16 by means of an additional pump 21 providing the required pressure. In this manner often a better saturation with air can be obtained. Since the introduced air then does no longer arrive in the liquid pump, generally additional means are to be provided for disrupting air bubbles. To that end a mixing vessel 22 in which a stirrer 23 is arranged is included in the duct 14, by means of which the air bubbles can be reduced. In particular it is possible to construct this vessel 22 as a buffer vessel in which the liquid can be stored for some time so as to promote the mixing. Such a buffer vessel can be used, of course, also in the case of FIG. 1.

It can sometimes be favourable to subject the liquid supplied by the duct 11 previously to a coalescence treatment so as to bring about a certain particle growth. Apparatuses for that purpose are known.

Such a coalescence apparatus can be positioned also in the triangular space between the partition 2 and the upper wall. In that case the injection of the air-liquid mixture will take place at the inlet end of this coalescence apparatus. For the rest this can also take place in a coalescence device located outside the separation device proper.

Furthermore it is also possible to use only one injection nozzle, in which case the ducts 11 and 14 are interconnected before this common nozzle, and it is also possible to use a mixing nozzle which, for instance, consists of nozzle 12 and 13 surrounding one another.

In particular a simple nozzle can be used if the liquid to be treated itself is pressurised and mixed with air by the pump 16, and the duct 17 is then connected to the liquid supply. Of course this is only possible if the character of the suspension is so that the pump 16 and the relief valve 15 are not substantially soiled thereby, or if this can be taken into the bargain.

Instead of air also any other gas can be supplied of course. In some cases the liquid to be treated comprises a gas or a substance which is highly volatile at the prevailing temperature, so that, if this liquid is pressurised, no separate gas needs to be supplied.

Furthermore it is possible to add additional substances promoting the separation or particle growth in any point of the duct mentioned above. It will be clear that for providing the gas-liquid mixture also a liquid may be used which is not originating from the system itself, if this liquid is compatible with the remaining liquids, for instance tap-water when the carrier liquid of the suspension is water.

In the manner described above it becomes possible to improve considerably the separation of often difficulty to be separated components. Within the scope of the invention many modifications are possible.

I claim:

1. A purification device for treating a liquid material including a carrier liquid having particles therein to effect separation of the particles from said carrier liquid, comprising:
    means forming a tank including a supply chamber for said liquid material and a discharge chamber for the carrier liquid and a portion of said particles,
    plate separation means positioned within said tank to receive flow of the liquid material therein and communicating at one end with said supply chamber and at the other end with said discharge chamber, said plate separation means having an upper surface extending laterally from a wall of said supply chamber and beneath the surface of the liquid material in said supply chamber to form a corner within said supply chamber, said corner defining a space widening laterally upwardly to progressively reduce the flow velocity through said supply chamber,
    means forming a supply duct for said liquid material and including an opening communicating with said corner of said supply chamber,
    means for removing floating particles from the surface of the liquid material in said supply chamber,
    means forming a source of pressurized gas in a liquid and including a pump to pressurize said liquid and gas and a pressure reducing valve connected to receive flow from said pump, and
    injection nozzle means connected to receive flow from said valve and positioned in said corner of said supply chamber, the pressurized gas and liquid being depressurized upon flow through the valve to form a mixture of gas bubbles in the liquid for admixture with the liquid material in said supply chamber to remove a portion of said particles by flotation prior to flow of the liquid material through said plate separator.

2. A purification device as set forth in claim 1 further including an additional gas compression pump for adding a gas to the liquid.

3. A purification device as set forth in claim 2 wherein the pressure side of the additional gas compression pump is connected to the pressure side of said pump, and
    means between said pumps and said valve means for dispersing the gas in said liquid.

4. A purification device as set forth in claim 1 further including means forming a buffer vessel to receive said pressurized gas and liquid prior to flow through said valve.

5. A purification device as set forth in claim 1 wherein said injection nozzle means includes an opening in said supply tank, the opening of the supply duct being positioned above the opening of the injection nozzle means.

6. A purification device as set forth in claim 5 wherein a baffle is located in said supply tank above the opening of said injection nozzle means.

7. A purification device as set forth in claim 1 wherein the supply duct is connected to a duct common to said injection nozzle to effect simultaneous introduction of the liquid material and the depressurized gas and liquid into said supply tank.

8. A purification device as set forth in claim 1 wherein said injection nozzle means includes a tube in said supply tank extending across a substantial portion thereof, said tube including outflow opening means to effect uniform outflow of the gas and liquid into said supply tank.

9. A purification device as set forth in claim 1 wherein said injection nozzle is rotatable.

10. The purification device of claim 1 wherein said discharge chamber further comprises a sediment collector positioned to receive the sediment discharged from said plate separator.

11. A purification device for treating a liquid material including a carrier liquid having particles therein to effect separation of the particles from said carrier liquid, comprising:
    a supply chamber for said liquid material;
    a discharge chamber for the carrier liquid and a portion of said particles;
    a plate separator having an input end communicating with said supply chamber to receive a flow of liquid material from it, having an output end communicating with said discharge chamber for discharging separated particles and carrier liquid into said discharge chamber, and having an upper surface extending laterally from a wall of said supply chamber and beneath the surface of the liquid material in said supply chamber to form a corner within said supply chamber, said corner defining a space widening laterally upwardly to progressively reduce the flow velocity through said supply chamber;

means forming a supply duct for said liquid material and including an opening communicating with said corner of said supply chamber;

means for removing floating particles from the surface of the liquid material in said supply chamber;

means forming a source of pressurized gas in a liquid and including a pump to pressurize said liquid and gas and a pressure-reducing valve connected to receive flow from said pump; and, injection nozzle means connected to receive flow from said pressure-reducing valve and positioned in said corner of said supply chamber to provide a flow into said supply chamber for admixture with the liquid material of a depressurized mixture of gas bubbles in the liquid so that a portion of said particles is removed by flotation prior to flow of the liquid material through said plate separator.

12. The purification device of claim 11 wherein said injector nozzle means and said means forming a supply duct for said liquid material are located so close to each other that the liquid material emerging from said means forming a supply duct will be intermixed with the flow from said injector nozzle means.

13. The purification device of claim 11 wherein said plate separator slopes downwardly from said supply chamber to said discharge chamber so that sediment is discharged from said plate separator into said discharge chamber.

14. The purification device of claim 13 wherein said discharge chamber further comprises a sediment collector positioned to receive the sediment discharged from said plate separator.

* * * * *